(12) United States Patent
Robel

(10) Patent No.: US 11,268,418 B2
(45) Date of Patent: Mar. 8, 2022

(54) ENGINE SYSTEM AND OPERATING STRATEGY FOR SELECTIVE IN SITU AND EX SITU LIMITING OF NOX PRODUCTION

(71) Applicant: Caterpillar Inc., Deerfield, IL (US)

(72) Inventor: Wade Robel, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 169 days.

(21) Appl. No.: 16/251,724

(22) Filed: Jan. 18, 2019

(65) Prior Publication Data

US 2020/0232365 A1 Jul. 23, 2020

(51) Int. Cl.
*F01N 3/10* (2006.01)
*F01N 3/20* (2006.01)
*F01N 3/035* (2006.01)
*B01D 53/94* (2006.01)
*F01N 3/08* (2006.01)

(52) U.S. Cl.
CPC ....... *F01N 3/2066* (2013.01); *B01D 53/9418* (2013.01); *F01N 3/035* (2013.01); *F01N 3/0842* (2013.01); *F01N 2560/026* (2013.01); *F01N 2610/02* (2013.01)

(58) Field of Classification Search
CPC ...... F01N 3/035; F01N 3/0842; F01N 3/2066; B01D 53/9418
USPC .......................................................... 60/274
See application file for complete search history.

(56) References Cited

U.S. PATENT DOCUMENTS

| 8,341,949 | B2 | 1/2013 | Tarabulski | |
|---|---|---|---|---|
| 9,221,016 | B2 | 12/2015 | Van Niekerk et al. | |
| 9,333,466 | B2 | 5/2016 | Johnson et al. | |
| 9,677,439 | B2 | 6/2017 | Gupta et al. | |
| 9,879,581 | B2 | 1/2018 | Rodman et al. | |
| 2006/0153761 | A1* | 7/2006 | Bandl-Konrad | F01N 3/0842 423/239.1 |
| 2007/0289291 | A1* | 12/2007 | Rabinovich | F01N 3/206 60/286 |
| 2009/0293452 | A1* | 12/2009 | Tarabulski | F01N 13/14 60/276 |
| 2011/0131957 | A1* | 6/2011 | Hepburn | F01N 3/021 60/278 |
| 2011/0146267 | A1* | 6/2011 | Hepburn | F01N 3/021 60/602 |
| 2011/0296833 | A1* | 12/2011 | Mardberg | B60W 30/1882 60/605.2 |

(Continued)

FOREIGN PATENT DOCUMENTS

WO WO-2018113930 A1 * 6/2018 ........... F02D 17/026

*Primary Examiner* — Jason D Shanske
(74) *Attorney, Agent, or Firm* — Brannon Sowers & Cracraft

(57) ABSTRACT

A compression ignition internal combustion engine system includes an engine and an exhaust system with an upstream exhaust conduit, a downstream exhaust conduit, and an exhaust placement mechanism for mixing exhaust with fuel and air within engine cylinders. The upstream exhaust conduit has a raw exhaust inlet, a raw exhaust outlet, and a diesel exhaust fluid (DEF) inlet between the raw exhaust inlet and the raw exhaust outlet. The downstream exhaust conduit includes a bare particulate filter and a selective catalytic reduction (SCR) device. Related methodology including operating the engine in a startup mode, and in a running mode once the SCR device is warmed, is also disclosed.

19 Claims, 2 Drawing Sheets

(56) References Cited

U.S. PATENT DOCUMENTS

| | | | |
|---|---|---|---|
| 2012/0017568 A1* | 1/2012 | Geveci | F01N 13/0093 60/274 |
| 2012/0204542 A1* | 8/2012 | Norris | F01N 3/2066 60/274 |
| 2013/0031891 A1* | 2/2013 | Ponnathpur | F02D 41/0275 60/274 |
| 2013/0118461 A1* | 5/2013 | Mitchell | F02D 41/0065 123/681 |
| 2014/0150433 A1* | 6/2014 | Van Niekerk | F02C 7/00 60/722 |
| 2014/0154139 A1* | 6/2014 | Van Niekerk | B01D 53/9418 422/119 |
| 2014/0154142 A1* | 6/2014 | Johnson | F01N 3/2066 422/168 |
| 2014/0331643 A1* | 11/2014 | Reich | F02D 41/0055 60/274 |
| 2015/0354476 A1* | 12/2015 | Ge | F02D 41/0002 60/274 |
| 2016/0258334 A1* | 9/2016 | Aoki | F01N 11/007 |
| 2017/0089248 A1* | 3/2017 | Evans | F01N 3/021 |
| 2017/0356325 A1* | 12/2017 | Zhang | F02B 37/00 |
| 2018/0135482 A1* | 5/2018 | Bailey | F01N 3/0842 |
| 2019/0309693 A1* | 10/2019 | Forsberg | F02M 26/43 |

* cited by examiner

US 11,268,418 B2

ENGINE SYSTEM AND OPERATING STRATEGY FOR SELECTIVE IN SITU AND EX SITU LIMITING OF NOX PRODUCTION

TECHNICAL FIELD

The present disclosure relates generally to an engine operating strategy for mitigating certain exhaust emissions, and more particularly to a multi-mode operating strategy for emissions reduction without the use of a diesel oxidation catalyst (DOC).

BACKGROUND

Reduction in certain emissions in exhaust from internal combustion engines has been of interest for many years. Combustion of a fuel and air within engine cylinders produces a variety of emissions, including water, carbon dioxide, particulate matter including soot and ash, unburned hydrocarbons, and oxides of nitrogen or "NOx." Various regulations have been put in place over the years to limit output of certain emissions, notably particulate matter and NOx. Manufacturers of engines and related systems have devised a great many different strategies for limiting discharge of particulate matter and NOx to the environment.

With regard to particulate matter, it has become conventional to equip internal combustion engine systems with filtration equipment to trap particulates that would otherwise be discharged to ambient surroundings. Filtration strategies, depending upon the type, can have various advantages or disadvantages but essentially in all instances must be regenerated to combust trapped material so that the filter is cleaned and can continue to perform its intended functions without causing operational problems such as excessive backpressure. Filter regeneration typically takes place according to one of two basic strategies, which are generally known as "passive" regeneration or "active" regeneration. In the case of active regeneration, a supplementary heat source such as an electric heater or combustion of additional fuel within the exhaust system itself is often employed to increase temperatures within the exhaust system to a point at which the trapped organic material, e.g., soot, will combust to form less undesirable compounds. Active regeneration generally requires additional equipment and undesired consumption of fuel energy. On the other hand, passive regeneration typically relies upon the use of catalyst materials to facilitate combustion of trapped particulate matter. Catalysts are often made of precious metals, and therefore require significant additional cost.

Other components such as selective catalytic reduction (SCR) devices to limit NOx are used in aftertreatment systems, and can make the overall system quite complex and expensive. SCR devices have proven effective, however, there are certain operating windows, such as during cold start, where SCR devices are not sufficiently heated to begin working, and NOx is difficult or not possible to limit, at least without creating other challenges. For these and other reasons, engineers are continually searching for materials, equipment, and techniques for reducing cost and complexity without sacrificing performance. Increasingly stringent emissions regulations, as well as expected new and different future regulations have further compounded such challenges. One example exhaust aftertreatment strategy is known from U.S. Pat. No. 8,341,949 to Tarabulski. While the concepts disclosed in this reference may work well for intended purposes, there is always room for improvement and alternative strategies.

SUMMARY OF THE INVENTION

In one aspect, a method of operating an engine system includes combusting a fuel and air compressed to an autoignition threshold in a plurality of combustion cylinders in an engine in the engine system, and limiting NOx production in situ during the combustion of the fuel and air. The method further includes filtering particulates in raw exhaust from the engine containing an engine-out NOx amount using a particulate filter coupled to the engine. The method still further includes conveying filtered exhaust containing the engine-out NOx amount from the particulate filter to a selective catalytic reduction (SCR) device, and producing, by the combustion of the fuel and air, heat energy of the filtered exhaust sufficient to warm the SCR device from a starting temperature to an activation temperature.

In another aspect, a method of operating an internal combustion engine system includes combusting fuel and air compressed to an autoignition threshold in a startup mode of an engine in the internal combustion engine system, and conveying exhaust produced by the engine in the startup mode through a non-catalyzed exhaust conduit to a bare particulate filter and a selective catalytic reduction (SCR) device positioned downstream of the bare particulate filter. The method further includes limiting NOx output of the internal combustion engine system in the startup mode at least in part by limiting NOx production in situ during the combustion of the fuel and air. The method still further includes combusting fuel and air compressed to an autoignition threshold in a running mode of the engine, and conveying exhaust produced by the engine in the running mode through the non-catalyzed exhaust conduit to the bare particulate filter and the SCR device, and limiting NOx output of the internal combustion engine system in the running mode at least in part by reducing NOx in the exhaust with the SCR device. The method still further includes transitioning the internal combustion engine system from the startup mode to the running mode based on warming of the SCR device to an activation temperature by heat energy of the exhaust produced by the engine in the startup mode.

In still another aspect, a compression ignition internal combustion engine system includes an engine including a cylinder block having a plurality of combustion cylinders formed therein, an intake manifold, and an exhaust manifold. The engine system further includes an exhaust system having an upstream exhaust conduit, a downstream exhaust conduit, and an exhaust placement mechanism structured to mix exhaust from the engine with fuel and air within the plurality of combustion cylinders. The upstream exhaust conduit has a raw exhaust inlet arranged to receive raw exhaust from the exhaust manifold, a raw exhaust outlet, and a diesel exhaust fluid (DEF) inlet positioned fluidly between the raw exhaust inlet and the raw exhaust outlet. The downstream exhaust conduit has a bare particulate filter having a filter inlet close-coupled to the raw exhaust outlet, a filter outlet, and a selective catalytic reduction (SCR) device having an SCR inlet close-coupled to the filter outlet, and an SCR outlet.

DETAILED DESCRIPTION

Figure 1:
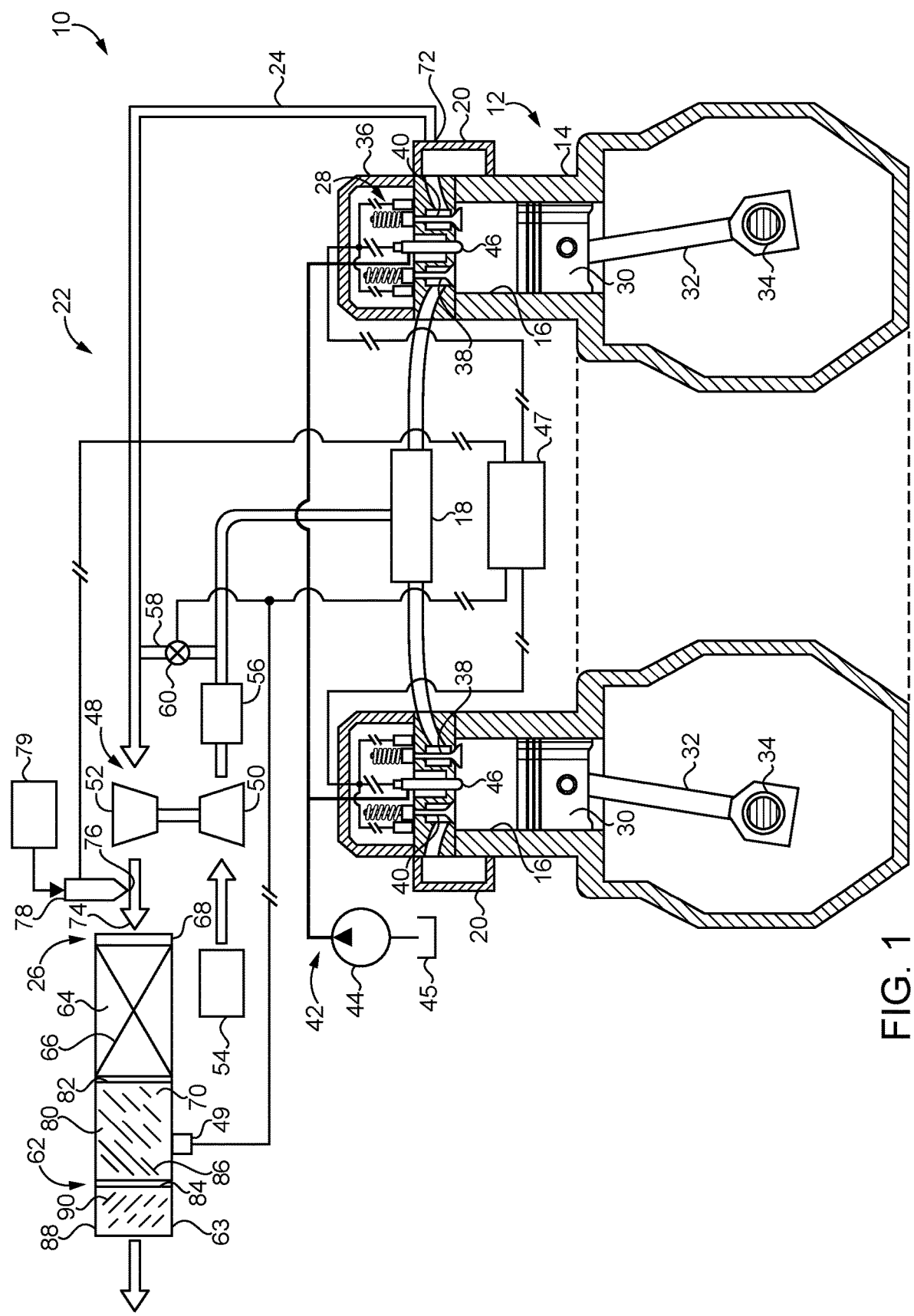
FIG. 1 is a side diagrammatic view of an internal combustion engine system, according to one embodiment.

Referring to FIG. 1, there is shown a compression ignition internal combustion engine system 10, according to one embodiment. Internal combustion engine system 10 (hereinafter "engine system 10") may operate on a liquid fuel, such as a diesel distillate liquid fuel, and includes an engine 12 having a cylinder block 14 with a plurality of combustion cylinders 16 formed therein. Engine 12 further includes an intake manifold 18 and an exhaust manifold 20. Combustion cylinders 16 may include any number, arranged in any suitable configuration. A plurality of pistons 30 are positioned one within each of combustion cylinders 16 and are movable, in a four-stroke engine cycle, between a bottom dead center position and a top dead center position to increase a pressure within a corresponding one of combustion cylinders 16 to an autoignition threshold. Each of pistons 30 is coupled with a connecting rod 32 that rotates a crankshaft 34, in a generally conventional manner. Engine 12 further includes a cylinder head 36, with a plurality of intake valves 38 and a plurality of exhaust valves 40 positioned therein and structured to open and close to control gas exchange between combustion cylinders 16 and intake manifold 18 or exhaust manifold 20 as the case may be. In one implementation, each of combustion cylinders 16 is associated with two intake valves 38 and two exhaust valves 40, however, the present disclosure is not thereby limited.

Engine system 10 further includes a fuel system 42 including a fuel pump 44 structured to convey a liquid fuel from a fuel supply 45 to a plurality of fuel injectors 46 each extending into one of combustion cylinders 16. Fuel pump 44 could be one of a plurality of fuel pumps, including a fuel transfer pump and a high-pressure fuel pump structured to pressurize fuel for supplying to a common rail that feeds fuel injectors 46. Implementations could also include hydraulically-actuated or mechanically-actuated fuel pressurization plungers positioned within or each associated with one of fuel injectors 46. Fuel injectors 46 and other components of engine system 10 can be electronically controlled, and may be controllably coupled with an electronic control unit or ECU 47. Engine system 10 further includes a turbocharger 48 having a compressor 50 structured to receive intake air for combustion from an air inlet 54, and a turbine 52 structured to be rotated by exhaust from engine 12. An aftercooler 56 for compressed intake air may be positioned downstream of compressor 50. An exhaust gas recirculation loop or EGR conduit 58 fluidly connects intake manifold 18 with exhaust manifold 20. An electronically controlled EGR valve 60 may be positioned at least partially within EGR conduit 58.

Engine system 10 further includes an exhaust system 22 having an upstream exhaust conduit 24, a downstream exhaust conduit 26, and an exhaust placement mechanism 28 structured to mix exhaust from engine 12 with fuel and air within combustion cylinders 16. Exhaust placement mechanism 28 could include equipment for so-called variable valve actuation, including a hydraulic actuator, an electrical actuator, or another device that is structured to vary an otherwise cam-dictated timing of exhaust valves 40 and/or intake valves 38, to mix exhaust produced by engine 10 in a prior engine cycle with fresh intake air and injected fuel, possibly with the addition of exhaust, in a subsequent engine cycle. Embodiments are contemplated where exhaust placement mechanism 28 includes or is the apparatus for recirculating exhaust from engine 12 such as EGR valve 60. EGR valve 60 may be electronically controlled by ECU 47. Still other strategies for exhaust placement might also be used, such that some exhaust remains resident within the associated combustion cylinders 16 when the next engine cycle commences.

Upstream exhaust conduit 24 may further have a raw exhaust inlet 72 arranged to receive raw exhaust from exhaust manifold 20, a raw exhaust outlet 74, and a diesel exhaust fluid (DEF) or reductant inlet 76 positioned fluidly between raw exhaust inlet 72 and raw exhaust outlet 74. Reductant inlet 76 may be structured to receive injected DEF, such as urea water or another suitable reductant, by way of a reductant injector 78 coupled with a reductant tank 79.

Downstream exhaust conduit 26 includes or is coupled with an aftertreatment system 62 and has a particulate filter 64 with a filter inlet 68 close-coupled to raw exhaust outlet 74. Particulate filter 64 further includes a filter outlet 70 and a filter medium 66 positioned fluidly between filter inlet 68 and filter outlet 70. Particulate filter 64 may be a bare particulate filter, meaning that filter medium 66 is free of any catalysts. Particulate filter 64 may also be free of precious metal catalysts, such as platinum group or "PGM" metals. Upstream exhaust conduit 24 may include a non-catalyzed conduit. As used herein, the term "close-coupled" means the absence of intervening components affecting exhaust composition, namely, NOx, unburned hydrocarbons or HC, particulate matter, or other exhaust constituents. The term "non-catalyzed" means free of any precious metal or base metal catalysts, zeolite or other catalysts. It will therefore be understood that an engine-out exhaust composition received at raw exhaust inlet 72 is the same as the exhaust composition of the raw exhaust that is conveyed through raw exhaust outlet 74 and received at filter inlet 68. "Raw" means untreated. Another way to understand application of this terminology is that an exhaust conduit is not fairly said to have a raw exhaust inlet and a raw exhaust outlet if emissions treatment componentry or materials are positioned between its inlet and its outlet.

Downstream exhaust conduit 26 also includes a selective catalytic reduction (SCR) device or SCR 80 having an SCR inlet 82 close-coupled to filter outlet 70 to receive filtered exhaust, and an SCR outlet 84. An SCR catalyst 86, such as a base metal, precious metal, zeolite, or other suitable known or proprietary catalyst is within SCR 80 and structured to reduce NOx according to generally known principles. An oxidation catalyst module 88 is coupled with, and may be close-coupled with, SCR outlet 84 and receives exhaust having been filtered by particulate filter 64 and reduced in NOx content by way of SCR 80. Oxidation catalyst module 88 could be a so-called ammonia oxidation or AMOX catalyst module, including an oxidation catalyst 90 positioned downstream of SCR 80 to consume ammonia slip and/or unburned hydrocarbons. Particulate filter 64 and SCR 80 may be contained in a common housing 63. It can further be noted that a distribution of catalysts within exhaust system 22 may be limited to SCR 80 and oxidation catalyst module 88. It will be appreciated that engine system 10, and exhaust system 22 in particular, is structured without a diesel oxidation catalyst or DOC as in certain earlier systems, the significance of which will be further apparent from the following description.

INDUSTRIAL APPLICABILITY

Figure 2:
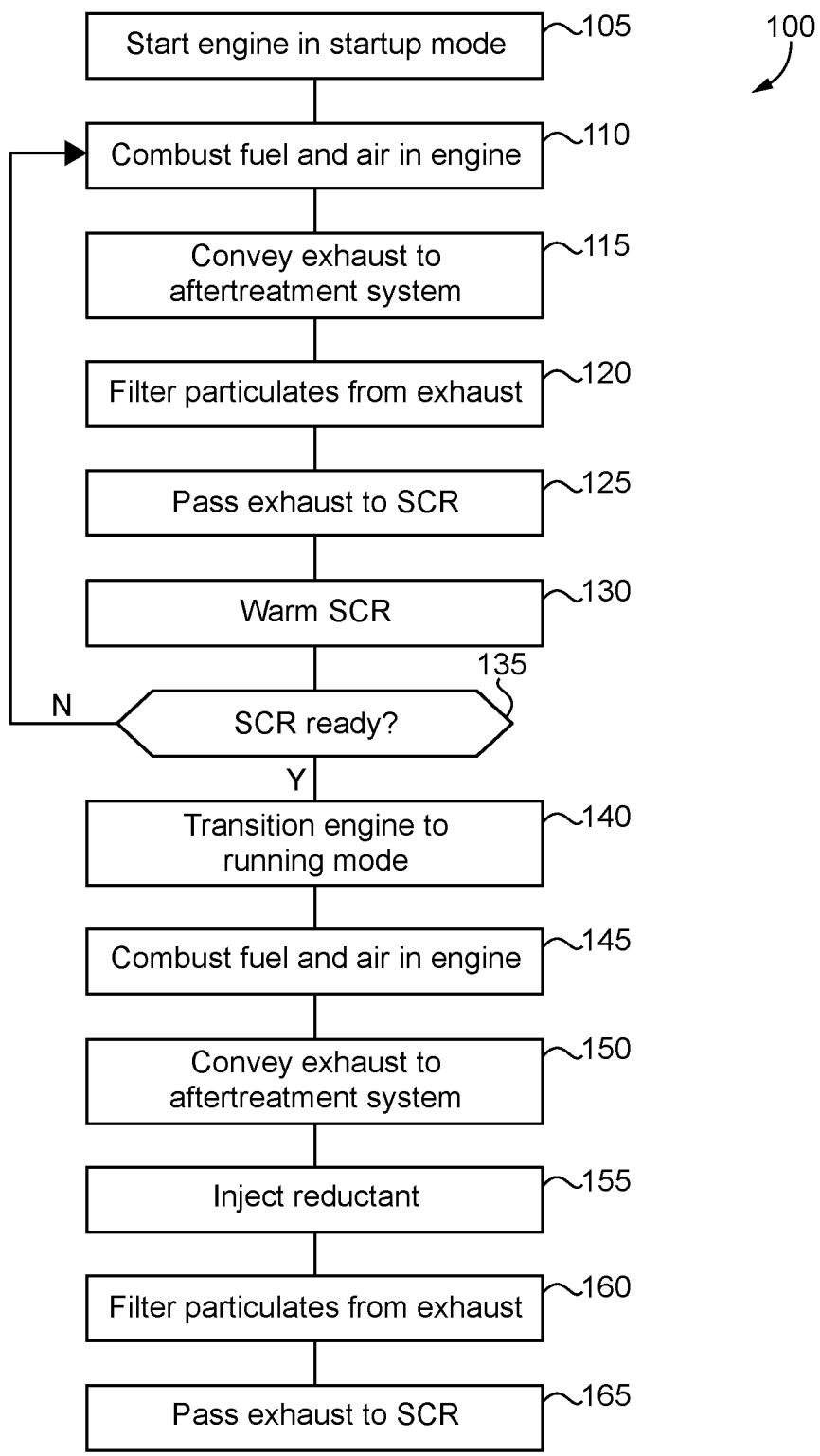
FIG. 2 is a flowchart illustrating example methodology, according to one embodiment.

Referring also now to FIG. 2, there is shown a flowchart 100 illustrating example methodology according to the present disclosure. Flowchart 100 includes a step 105 where engine 12 is started in a startup mode, and advances to a step 110 where fuel and air compressed to an autoignition threshold is combusted in engine 12. From step 110 the process advances to a step 115 where exhaust is conveyed from engine 12 to aftertreatment system 62, including conveying exhaust to filter 64 and then conveying the filtered exhaust to SCR 80. At a step 120 particulates are filtered from exhaust from engine 12 in filter 64, and at a step 125 filtered exhaust is passed to SCR 80 positioned downstream of filter 64.

Raw exhaust received by filter 64 from engine 12 may contain an engine-out NOx amount, and filtered exhaust conveyed from filter 64 to SCR 80 may also contain the engine-out NOx amount. In the startup mode, which can include a cold start, NOx output of engine system 10 can be limited at least in part by limiting NOx production in situ during the combustion of the fuel and air. Limiting NOx production in situ means limiting NOx production in the combustion reactions in cylinders 16 to produce an engine-out NOx amount that is less than what would be expected otherwise. Passing filtered exhaust to SCR 80 can warm SCR 80 from a starting temperature, which may be an ambient temperature, to an activation temperature, shown at step 130. The combustion of the fuel and air in the startup mode can produce heat energy of the filtered exhaust conveyed from filter 64 to SCR 80 that is sufficient to warm SCR 80 from the starting temperature to the activation temperature. Another way to understand this principle is that SCR 80 is warmed to the activation temperature without providing additional heat in the form of additional fuel burned within exhaust system 22, additional heat provided such as by way of an electric heater, or by some other technique. Producing of the heat energy can further include producing, by the combustion of the fuel and air in the startup mode, heat energy sufficient to warm SCR 80 from a starting temperature to an activation temperature greater than 200° C., and potentially greater than 225° C., in 200 seconds or less, potentially 180 seconds or less. The starting temperature might be an ambient temperature if engine 12 has been turned off for some time, for instance less than 30° C., although the present disclosure is not thereby limited.

From step 130 the process can advance to a step 135 to query is SCR ready? If not, the process can return to continue operating in the startup mode until such point at which SCR 80 is sufficiently warmed. Engine system 10 can be equipped with an SCR temperature sensor 49 in communication with ECU 47 for this determination. If SCR 80 is ready at step 135, the process can advance to step 140 to transition engine 12 and engine system 10 to a running mode. The running mode can be a low-idle mode, for instance, and/or could include a range of sub-modes, including up to full load. Operating parameters in the running mode can be determined at least in part by engine speed and load demands. Transitioning engine 12 and engine system 10 from the startup mode to the running mode can thus be understood to be based on warming of SCR 80 to an activation temperature by heat energy of exhaust produced by engine 12 in the startup mode.

From step 140 the process can advance to step 145 to combust fuel and air compressed within combustion cylinders 16 to an autoignition threshold. From step 145 the methodology can advance to step 150 to convey exhaust to aftertreatment system 62. With SCR 80 now activated, NOx output of engine system 10 can be limited in the running mode at least in part by reducing NOx in the exhaust with SCR 80. In flowchart 100, reductant is injected at a step 155, and particulates filtered from exhaust at a step 160. Passing exhaust to SCR 80 is shown at a step 165.

It is contemplated that a variety of techniques may be used for limiting NOx production in situ, including mixing exhaust with the fuel and air in combustion cylinders 16 as discussed herein. Mixing of the exhaust with the fuel and air may include conveying recirculated exhaust from engine 12 into combustion cylinders 16. Electronic control of EGR valve 60 can be used to start, stop, or vary the exhaust gas recirculation. It should also be appreciated that in the running mode filter 64 may be passively regenerated. In one implementation an engine-out exhaust temperature is increased to initiate the passive regeneration. The increasing of the engine-out exhaust temperature can be performed at least in part by recirculating hot exhaust from engine 12 to combustion cylinders 16. Recirculated exhaust may be uncooled, or only partially cooled, and thus supplied to combustion cylinders at a temperature greater than that of the compressed intake air. Other techniques could be used to increase engine-out exhaust temperature such as by use of a variable geometry turbine, a backpressure valve, late fuel injections, variable valve timing, injection rate shaping, or still another technique.

From the foregoing description, it will be appreciated that NOx production, and NOx output of engine system 10, is managed differently in the startup mode than in the running mode. The startup mode can be understood as limiting NOx production in situ by way of manipulating combustion conditions, whereas in the running mode NOx production is limited at least predominately ex situ by way of SCR 80. It can further be appreciated that engine 12 may be operated to produce extra heat to assist in rapidly warming SCR 80. NOx output in the startup mode may include limiting NOx production of engine 12 to a greater relative extent, whereas in the running mode NOx production of engine 12 may be limited to a relatively lesser extent given the availability of NOx reduction with SCR 80. The relatively lesser extent might be no limitation in NOx production by engine 12 at all. Oxidation catalyst 90 can be employed to further treat exhaust conveyed from SCR 80 as discussed herein.

As also mentioned above, engine system 10 is not equipped with a DOC, in contrast to many conventional internal combustion engine systems. It has been discovered that the DOC provides thermal mass that can slow the rate at which an associated SCR device is warmed to a catalytic activation temperature. By managing NOx at cold start and eliminating a DOC, the thermal mass of the aftertreatment system in accordance with the present disclosure is reduced. For this reason it tends to be easier and faster to warm SCR 80, and any efficiency penalty or other perceived disadvantage from limiting NOx in situ is needed for only a relatively short time when engine system 10 is cold started. In the running mode, relatively higher NOx production of engine 12 is more acceptable because the NOx can participate in passively regenerating filter 64 and is reduced by SCR 80. As also discussed herein, filter 64 may be a bare particulate filter, and reductant inlet 76 can therefore be positioned upstream of filter 64. Use of a bare filter free of precious metal catalysts, or otherwise including only materials that do not oxidize ammonia or other reductants, enables reductant to pass through filter 64 without risk of the reductant itself being rendered inactive or degraded by catalysts. Injecting reductant upstream of a filter free of precious metal catalysts also enables filter 64 and SCR 80 to be packaged within a single unit, reducing package size and costs.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine system comprising:
cold starting an engine in the engine system;
combusting a fuel and air compressed to an autoignition threshold in a plurality of combustion cylinders in the engine;
limiting NOx production in situ but not ex situ during the combustion of the fuel and air;
filtering particulates in raw exhaust from the engine containing an engine-out NOx amount using a particulate filter coupled to the engine;
conveying filtered exhaust containing the engine-out NOx amount from the particulate filter to a selective catalytic reduction (SCR) device;
producing, by the combustion of the fuel and air, heat energy of the filtered exhaust sufficient to warm the SCR device from a cold starting temperature where the SCR device is not activated to an activation temperature where the SCR device is activated; and
limiting NOx production ex situ by way of injecting a reductant into the raw exhaust from the engine containing the engine-out NOx amount, at a location upstream of the particulate filter, after the SCR device has warmed from the cold starting temperature to the activation temperature.

2. The method of claim 1 wherein the limiting of NOx production in situ includes mixing exhaust with the fuel and air in the plurality of combustion cylinders.

3. The method of claim 2 wherein the mixing of the exhaust with the fuel and air further includes conveying recirculated exhaust from the engine into the plurality of combustion cylinders.

4. The method of claim 1 wherein the combusting of the fuel and air includes combusting the fuel and air in all of the combustion cylinders in the engine, and further comprising operating the engine system in a startup mode by way of the combustion of the fuel and air in all of the plurality of combustion cylinders in the engine.

5. The method of claim 4 wherein the producing of the heat energy further includes producing, by the combustion of the fuel and air, heat energy sufficient to warm the SCR device to an activation temperature greater than 200 degrees C. in 200 seconds or less.

6. The method of claim 4 further comprising:
transitioning the engine system to a running mode based on warming the SCR device to the activation temperature; and
the injecting of the reductant into raw exhaust from the engine at a location upstream of the particulate filter further includes injecting the reductant in the running mode.

7. The method of claim 6 further comprising passively regenerating the particulate filter in the running mode.

8. The method of claim 7 wherein the limiting of NOx production in situ includes limiting NOx production of the engine to a greater relative extent in the startup mode, and further comprising limiting NOx production of the engine to a lesser relative extent in the running mode.

9. The method of claim 7 further comprising increasing an engine-out exhaust temperature to initiate the passive regeneration at least in part by recirculating hot exhaust from the engine to the plurality of combustion cylinders.

10. A method of operating an internal combustion engine system comprising:
combusting fuel and air compressed to an autoignition threshold in a startup mode of an engine in the internal combustion engine system;
conveying exhaust produced by the engine in the startup mode through a non-catalyzed exhaust conduit to a bare particulate filter and a selective catalytic reduction (SCR) device positioned downstream of the bare particulate filter;
limiting NOx output of the internal combustion engine system in the startup mode at least in part by limiting NOx production in situ during the combustion of the fuel and air;
combusting fuel and air compressed to an autoignition threshold in a running mode of the engine;
conveying exhaust produced by the engine in the running mode through the non-catalyzed exhaust conduit to the bare particulate filter and the SCR device;
limiting NOx output of the internal combustion engine system in the running mode at least in part by reducing NOx in the exhaust with the SCR device;
determining the SCR device has warmed to an activation temperature by heat energy of the exhaust produced by the engine in the startup mode;
transitioning the internal combustion engine system from the startup mode to the running mode based on the determination that the SCR device has warmed to an activation temperature by the heat energy of the exhaust produced by the engine in the startup mode; and
following the transitioning of the internal combustion engine system from the startup mode to the running mode, commencing injecting a reductant into the exhaust produced by the engine, at a location upstream of the bare particulate filter and downstream of a turbine in a turbocharger.

11. The method of claim 10 further comprising increasing an engine-out exhaust temperature at least in part by recirculating hot exhaust from the engine in the running mode.

12. The method of claim 11 further comprising passively regenerating the bare particulate filter by way of the increased engine-out exhaust temperature.

13. The method of claim 11 wherein the limiting of NOx output in the startup mode includes limiting NOx production of the engine to a greater relative extent, and the limiting of NOx output in the running mode includes limiting NOx production of the engine to a relatively lesser extent.

14. The method of claim 10 further comprising producing, by the combustion of the fuel and air in the startup mode, heat energy of the exhaust sufficient to warm the SCR device to an activation temperature greater than 200 degrees C. in 200 seconds or less.

15. A compression ignition internal combustion engine system comprising:
an engine housing including a cylinder block having a plurality of combustion cylinders formed therein, an intake manifold, and an exhaust manifold;

an exhaust system including an upstream exhaust conduit, a downstream exhaust conduit, and an exhaust placement mechanism structured to mix exhaust from the engine with fuel and air within the plurality of combustion cylinders;

the upstream exhaust conduit having a raw exhaust inlet arranged to receive raw exhaust from the exhaust manifold, a raw exhaust outlet, and a diesel exhaust fluid (DEF) inlet positioned fluidly between the raw exhaust inlet and the raw exhaust outlet;

the downstream exhaust conduit including a bare particulate filter having a filter inlet close-coupled to the raw exhaust outlet, a filter outlet, and a selective catalytic reduction (SCR) device having an SCR inlet close-coupled to the filter outlet, and an SCR outlet; and the exhaust system is free of catalysts from the exhaust manifold to the filter outlet;

a DEF injector coupled with the DEF inlet;

an electronic control unit (ECU) coupled with the DEF injector and structured to:

transition the internal combustion engine system from a startup mode limiting NOx production in situ but not ex situ to a running mode; and inject reductant using the DEF injector to limit NOx production ex situ in the running mode.

16. The engine system of claim 15 wherein the exhaust system further includes a DEF injector coupled with the DEF inlet, and an oxidation catalyst positioned downstream of the SCR device.

17. The engine system of claim 16 wherein a distribution of catalysts within the exhaust system is limited to the SCR device and the oxidation catalyst.

18. The engine system of claim 15 wherein the bare particulate filter and the SCR device are contained in a common housing.

19. The engine system of claim 15 wherein the exhaust placement mechanism includes an exhaust gas recirculation (EGR) valve.

* * * * *